United States Patent
Araki et al.

(10) Patent No.: US 12,511,759 B2
(45) Date of Patent: Dec. 30, 2025

(54) MOVING OBJECT DETECTION DEVICE, MOVING OBJECT DETECTION METHOD, SYSTEM, AND STORAGE MEDIUM

(71) Applicant: HONDA MOTOR CO., LTD., Tokyo (JP)

(72) Inventors: Satoru Araki, Wako (JP); Gakuyo Fujimoto, Wako (JP); Masamitsu Tsuchiya, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 365 days.

(21) Appl. No.: 18/099,994

(22) Filed: Jan. 23, 2023

(65) Prior Publication Data

US 2023/0245325 A1    Aug. 3, 2023

(30) Foreign Application Priority Data

Jan. 28, 2022   (JP) ................................ 2022-011780
Jan. 28, 2022   (JP) ................................ 2022-011784
Jan. 28, 2022   (JP) ................................ 2022-011790

(51) Int. Cl.
*G06T 7/215*   (2017.01)
*B60W 30/09*   (2012.01)
(Continued)

(52) U.S. Cl.
CPC ......... *G06T 7/215* (2017.01); *B60W 30/0956* (2013.01); *G06T 3/40* (2013.01);
(Continued)

(58) Field of Classification Search
CPC ........... G06V 20/56–588; G06V 20/46; G06V 40/10; G06V 20/54; G06V 10/24;
(Continued)

(56) References Cited

U.S. PATENT DOCUMENTS

2004/0101162 A1   5/2004  Higaki et al.
2009/0208128 A1   8/2009  Hayashi et al.
(Continued)

FOREIGN PATENT DOCUMENTS

| CN | 104903946 | 9/2015 |
|----|-----------|--------|
| CN | 108496056 | 9/2018 |

(Continued)

OTHER PUBLICATIONS

Chinese Office Acton for Chinese Patent Application No. 202310086695.9 mailed Jun. 20, 2025.
(Continued)

*Primary Examiner* — Michael Horabik
*Assistant Examiner* — Stefano Anthony Dardano
(74) *Attorney, Agent, or Firm* — Amin, Turocy & Watson, LLP

(57) ABSTRACT

Provided is a moving object detection device including a storage medium storing computer-readable commands and a processor connected to the storage medium, the processor executing the computer-readable commands to: acquire image data including a plurality of frames representing a surrounding condition of a mobile object, which are photographed by a camera mounted in the mobile object in time series; calculate a difference image between the plurality of frames by calculating differences between the plurality of frames and binarizing the differences using a first value and a second value; extract a grid for which the density of pixels with the first value is equal to or larger than a first threshold value from among a plurality of grids set in the difference image; and detect the extracted grid as a moving object.

9 Claims, 12 Drawing Sheets

(51) Int. Cl.
  *B60W 30/095* (2012.01)
  *G06T 3/40* (2024.01)
(52) U.S. Cl.
  CPC ....... *B60W 30/09* (2013.01); *B60W 2420/403* (2013.01); *B60W 2554/4026* (2020.02); *B60W 2554/404* (2020.02); *G06T 2207/20021* (2013.01); *G06T 2207/30252* (2013.01)
(58) Field of Classification Search
  CPC .......... G06V 10/28; G06T 2207/20021; G06T 2207/30252–30261; G06T 3/40; G06T 7/215; G06T 7/254; G06T 2207/10016; B60W 2420/403; B60W 30/09; B60W 30/095–0956
  See application file for complete search history.

(56) References Cited

U.S. PATENT DOCUMENTS

| | | | |
|---|---|---|---|
| 2015/0063647 A1* | 3/2015 | Ryu | G06T 7/254 |
| | | | 382/104 |
| 2015/0284001 A1* | 10/2015 | Watanabe | H04N 7/18 |
| | | | 701/36 |
| 2016/0225160 A1 | 8/2016 | Shimada | |
| 2017/0013198 A1* | 1/2017 | Wada | G03B 5/00 |
| 2018/0322640 A1* | 11/2018 | Kim | G05D 1/0251 |
| 2019/0057588 A1* | 2/2019 | Savvides | G06V 20/52 |
| 2020/0014898 A1* | 1/2020 | Imai | H04N 23/11 |
| 2020/0065981 A1* | 2/2020 | Akashi | G06T 7/194 |
| 2020/0284580 A1 | 9/2020 | Sasamoto et al. | |
| 2021/0133483 A1* | 5/2021 | Prabhu | G06V 10/454 |
| 2022/0183208 A1* | 6/2022 | Sibley | G06V 20/56 |

FOREIGN PATENT DOCUMENTS

| | | | |
|---|---|---|---|
| JP | 09-016782 | | 1/1997 |
| JP | 2001-094976 | | 4/2001 |
| JP | 2001236506 A | * | 8/2001 |
| JP | 2005-346387 | | 12/2005 |
| JP | 2009-194681 | | 8/2009 |
| JP | 2010-124316 | | 6/2010 |
| JP | 2017-030380 | | 2/2017 |
| JP | 2017-123658 | | 7/2017 |
| JP | 2018-164199 | | 10/2018 |
| JP | 2021-144689 | | 9/2021 |

OTHER PUBLICATIONS

Japanese Office Action for Japanese Patent Application No. 2022-011780 dated Aug. 26, 2025.
Japanese Office Action for Japanese Patent Application No. 2022-011784 dated Aug. 26, 2025.
Japanese Office Action for Japanese Patent Application No. 2022-011790 dated Aug. 26, 2025.

\* cited by examiner

MOVING OBJECT DETECTION DEVICE, MOVING OBJECT DETECTION METHOD, SYSTEM, AND STORAGE MEDIUM

CROSS-REFERENCE TO RELATED APPLICATION

The application is based on Japanese Patent Application No. 2022-011780 filed on Jan. 28, 2022, the content of which incorporated herein by reference.

BACKGROUND

Field of the Invention

The present invention relates to a moving object detection device, a moving object detection method, a system, and a storage medium.

Description of Related Art

Hitherto, the technology of detecting a moving object existing near a vehicle on the basis of image data, which is obtained by an in-vehicle camera and showing the front field of view of the vehicle is known. For example, Japanese Patent Application Laid-Open No. 2021-144689 discloses the technology of executing signal processing, which is based on a trained result, for image data showing the surrounding condition of a vehicle, to thereby output the result of identifying a moving object existing in the image data.

The technology disclosed in Japanese Patent Application Laid-Open No. 2021-144689 uses a deep neural network (DNN) such as a convolutional neural network to detect a moving object existing near a vehicle. However, such a machine learning technique requires preparation of a large amount of data in advance, and tends to put a large processing load at the time of execution thereof. As a result, a moving object existing near a vehicle cannot be detected immediately in some cases.

SUMMARY

The present invention has been made in view of the above-mentioned circumstances, and has an object to provide a moving object detection device, a moving object detection method, a system, and a storage medium capable of easily detecting a moving object existing near a vehicle immediately.

A moving object detection device, a moving object detection method, a system, and a storage medium according to the present invention adopt the following configuration.

(1): According to one aspect of the present invention, there is provided a moving object detection device comprising a storage medium storing computer-readable commands and a processor connected to the storage medium, the processor executing the computer-readable commands to: acquire image data including a plurality of frames representing a surrounding condition of a mobile object, which are photographed by a camera mounted in the mobile object in time series; calculate a difference image between the plurality of frames by calculating differences between the plurality of frames and binarizing the differences using a first value and a second value; extract a grid for which the density of pixels with the first value is equal to or larger than a first threshold value from among a plurality of grids set in the difference image; and detect the extracted grid as a moving object, in which each of the plurality of grids is set such that as a distance from the camera becomes larger, the grid has a smaller pixel size.

(2): In the aspect (1), the processor enlarges a frame photographed at a previous time point on the basis of a speed of the mobile object between in a photography interval for photographing the plurality of frames, and calculates a difference image between the enlarged frame photographed at the previous time point and a frame photographed at a current time point.

(3): In the aspect (2), the processor enlarges the frame photographed at the previous time point with respect to a vanishing point of the frame photographed at the previous time point.

(4): In the aspect (1), the processor corrects a frame photographed at the previous time point on the basis of a yaw rate of the mobile object in a photography interval for photographing the plurality of frames, and calculates a difference image between the corrected frame photographed at the previous time point and a frame photographed at a current time point.

(5): In the aspect (1), the processor changes the first threshold value according to the distance between each of the plurality of grids and the camera.

(6): In the aspect (1), the processor sets the size of each of the plurality of grids to a first size when the distance from the camera is equal to or smaller than a first distance, sets the size of each of the plurality of grids to a second size smaller than the first size when the distance from the camera is larger than the first distance and is equal to or smaller than a second distance, or sets the size of each of the plurality of grids to a third size smaller than the second size when the distance from the camera is larger than the second distance.

(7): According to another aspect of the present invention, there is provided a system including: the moving object detection device according to the aspect (1); and a driving assistance device configured to execute driving assistance for the mobile object on the basis of the result of detection by the moving object detection device.

(8): According to another aspect of the present invention, there is provided a moving object detection method including: acquiring image data including a plurality of frames representing a surrounding condition of a mobile object, which are photographed by a camera mounted in the mobile object in time series;

calculating a difference image between the plurality of frames by calculating differences between the plurality of frames and binarizing the differences using a first value and a second value; extracting a grid for which the density of pixels with the first value is equal to or larger than a first threshold value from among a plurality of grids set in the difference image; and detecting the extracted grid as a moving object, in which each of the plurality of grids is set such that as a distance from the camera becomes larger, the grid has a smaller pixel size.

(9): According to another aspect of the present invention, there is provided a non-transitory computer-readable storage medium storing a program for causing a computer to: acquire image data including a plurality of frames representing a surrounding condition of a mobile object, which are photographed by a camera mounted in the mobile object in time series; calculate a difference image between the plurality of frames by calculating differences between the plurality of frames and binarizing the differences using a first value and a second value; extract a grid for which the density of pixels with the first value is equal to or larger than a first threshold value from among a plurality of grids set in the difference image; and detect the extracted grid as a moving object, in which each of the plurality of grids is set such that as a distance from the camera becomes larger, the grid has a smaller pixel size.

According to the aspects (1) to (9), it is possible to easily detect a moving object existing near a vehicle immediately.

According to the aspect (2) or (3), it is possible to accurately calculate a difference image between a frame photographed at a previous time point and a frame photographed at a current time point.

According to the aspect (4), it is possible to accurately calculate a difference image in consideration of a yaw rate of a mobile object.

According to the aspect (5) or (6), it is possible to accurately detect a moving object according to a distance from a camera.

According to the aspect (7), it is possible to preferably use the result of detection by the moving object detection device for driving assistance.

DESCRIPTION OF EMBODIMENTS

First Embodiment

Figure 1:
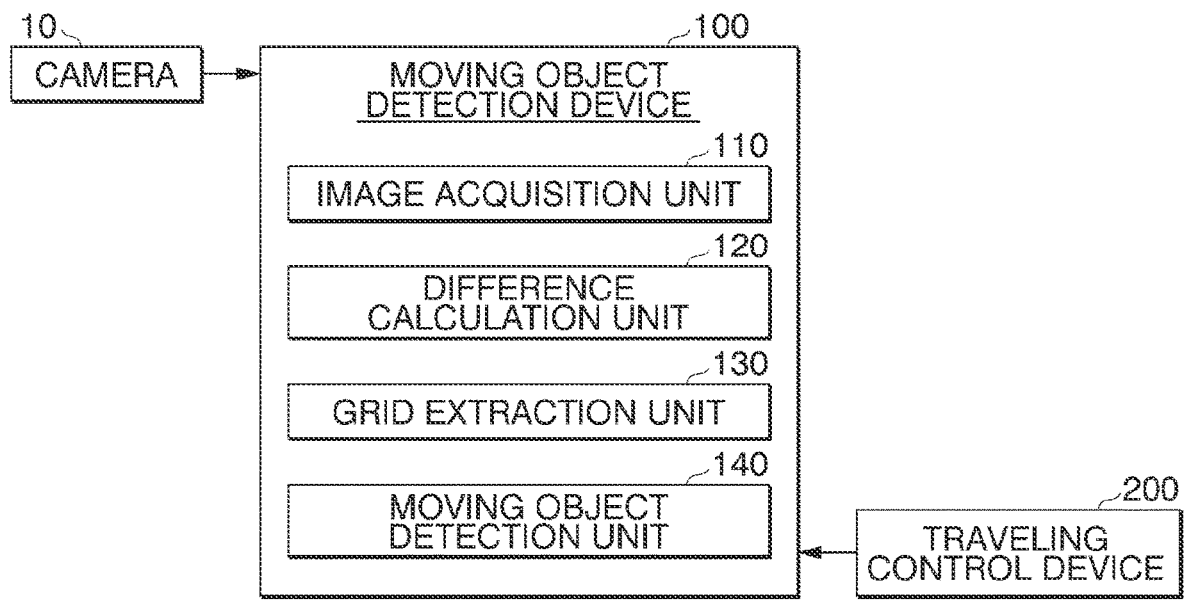
FIG. 1 is a diagram illustrating an example of the configuration and peripheral devices of a moving object detection device according to a first embodiment.

Referring to the drawings, a moving object detection device, a moving object detection method, a system, and a storage medium according to embodiments of the present invention are described below. The moving object detection device is mounted on a mobile object, for example. The moving object is, for example, a four-wheeled vehicle, a two-wheeled vehicle, a micromobility, a robot that moves by itself, or a portable device such as a smartphone that is placed on a mobile object that moves by itself or is carried by a person. In the following description, the mobile object is assumed to be a four-wheeled vehicle and the mobile object is referred to as a "vehicle". The moving object detection device is not limited to those mounted on a mobile object, but may also be the one that performs the processing described below based on images photographed by a fixed-point observation camera or a smartphone camera.

FIG. 1 is a diagram illustrating an example of the configuration and peripheral devices of a moving object detection device 100. The moving object detection device 100 communicates with a camera 10 and a traveling control device 200, for example.

The camera 10 is mounted on the back surface or the like of a front windshield of a vehicle M, photographs at least a road surface in the traveling direction of the vehicle M in time series, and outputs the photographed images to the moving object detection device 100. A sensor fusion device may be placed between the camera 10 and the moving object detection device 100, but description thereof is omitted here. The driving control system 200 is, for example, an autonomous driving control device that allows the vehicle M to drive autonomously, or a driving assistance device that performs distance control, automatic braking control, and automatic lane change control.

The moving object detection device 100 includes, for example, an image acquisition unit 110, a difference calculation unit 120, a grid extraction unit 130, and a moving object detection unit 140. These components are implemented by a hardware processor such as a CPU (Central Processing Unit) executing a program (software), for example. A part or all of these components may be implemented by hardware (circuit unit including circuitry) such as an LSI (Large Scale Integration), an ASIC (Application Specific Integrated Circuit), an FPGA (Field-Programmable Gate Array), or a GPU (Graphics Processing Unit), or may be implemented through cooperation between software and hardware. The program may be stored in a storage device (storage device including non-transitory storage medium) such as an HDD (Hard Disk Drive) or flash memory in advance, or may be stored in a removable storage medium (non-transitory storage medium) such as a DVD or CD-ROM and the storage medium may be attached to a drive device to install the program.

Figure 2:
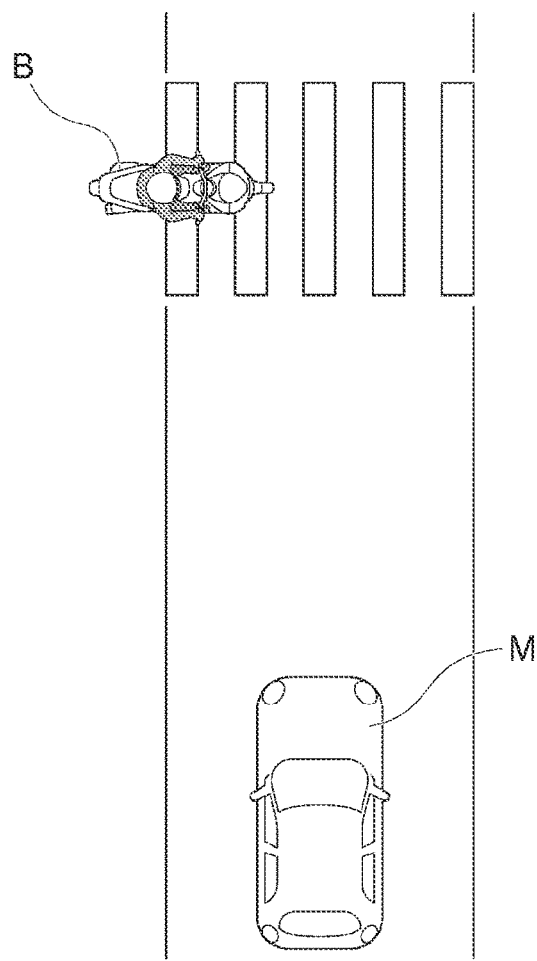
FIG. 2 is a diagram illustrating an example of the surrounding condition of a vehicle M including the moving object detection device.

FIG. 2 is a diagram illustrating an example of the surrounding condition of the vehicle M including the moving object detection device 100. FIG. 2 illustrating an exemplary scene in which a motorbike B is traveling ahead of the vehicle M while the vehicle M including the moving object detection device 100 is traveling on a road. In the following description, the moving object detection device 100 detects the motorbike B as a moving object. However, the present invention is not limited to application to such a scene.

Figure 3:
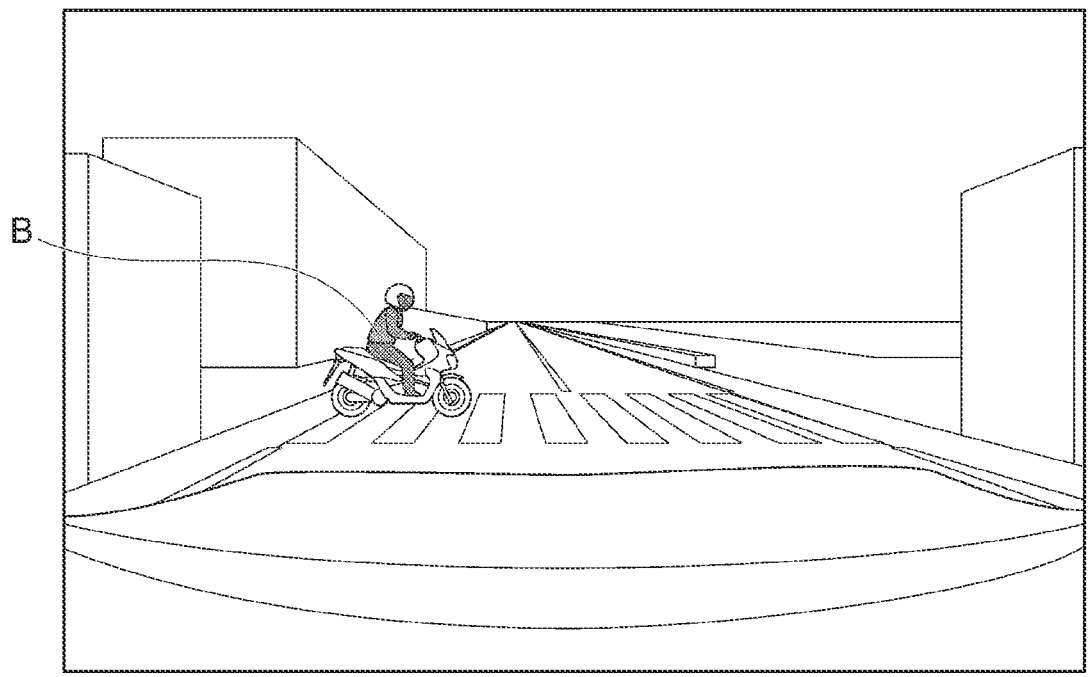
FIG. 3 is a diagram illustrating an example of an image obtained by photographing the front field of view of the vehicle by a camera under the surrounding condition illustrated in FIG. 2.

FIG. 3 is a diagram illustrating an example of an image obtained by photographing the front field of view of the vehicle M by the camera 10 under the surrounding condition illustrated in FIG. 2. The image acquisition unit 110 acquires image data including a plurality of frames representing the surrounding condition of the mobile object M, which are photographed by the camera 10 mounted in the vehicle M in time series. More specifically, for example, the image acquisition unit 110 acquires the image data from the camera 10 in the frame rate of 30 Hz.

The difference calculation unit 120 calculates a difference between pixel values for the plurality of frames acquired by the image acquisition unit 110, and binarizes the calculated difference using a first value (for example, 1) and a second value (for example, 0) to calculate a difference image DI between the plurality of frames. More specifically, first, the difference calculation unit 120 applies gray transform to the plurality of frames acquired by the image acquisition unit 110 to convert the RGB image to a grayscale image.

Next, the difference calculation unit 120 enlarges a frame (hereinafter sometimes referred to as "previous frame") photographed at a previous time point with respect to the vanishing point of the previous frame on the basis of the speed of the vehicle M in a photography interval for photographing the plurality of frames, to thereby align the previous frame with a frame (hereinafter sometimes referred to as "current frame") photographed at the current time point.

Figure 4:
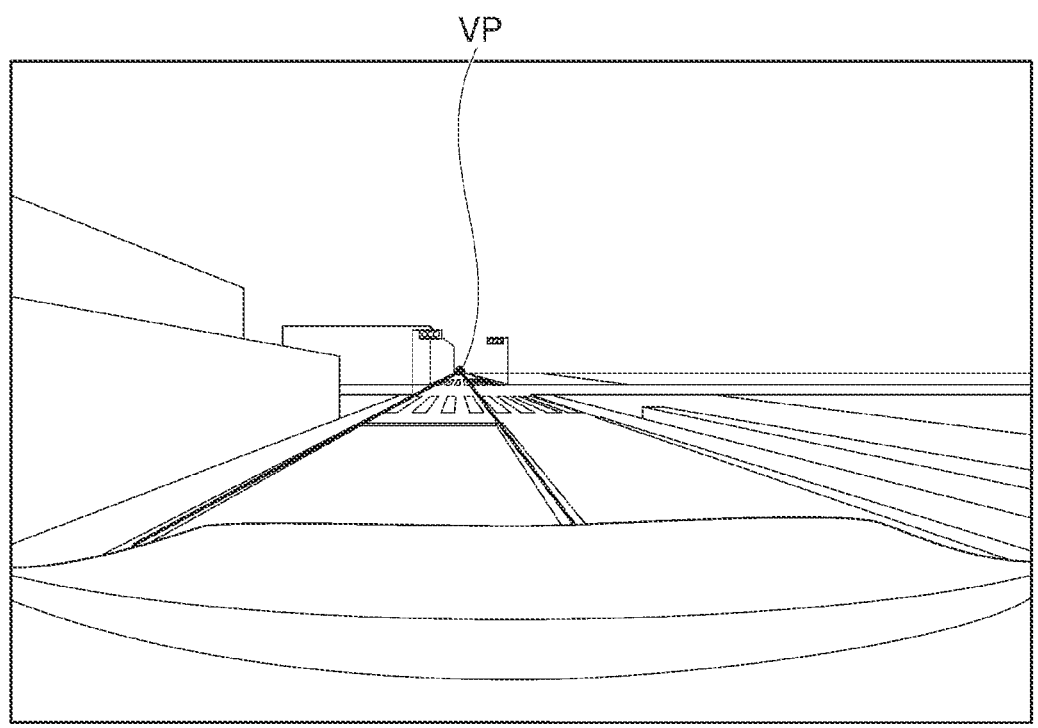
FIG. 4 is a diagram illustrating an example of a vanishing point to be used as a reference point for enlarging a frame.

FIG. 4 is a diagram illustrating an example of the vanishing point to be used as a reference point for enlarging a frame. In FIG. 4, VP represents the vanishing point of frame. The vanishing point VP is defined as an intersection formed by extending the bode sides of a lane in which the vehicle M is traveling, for example. The difference calculation unit 120 estimates the movement distance of the vehicle M from the speed (average speed) of the vehicle M measured between the previous time point and the current time point, for example, and enlarges the previous frame with respect to the vanishing point VP by an enlargement ratio that depends on the movement distance.

Figure 5:
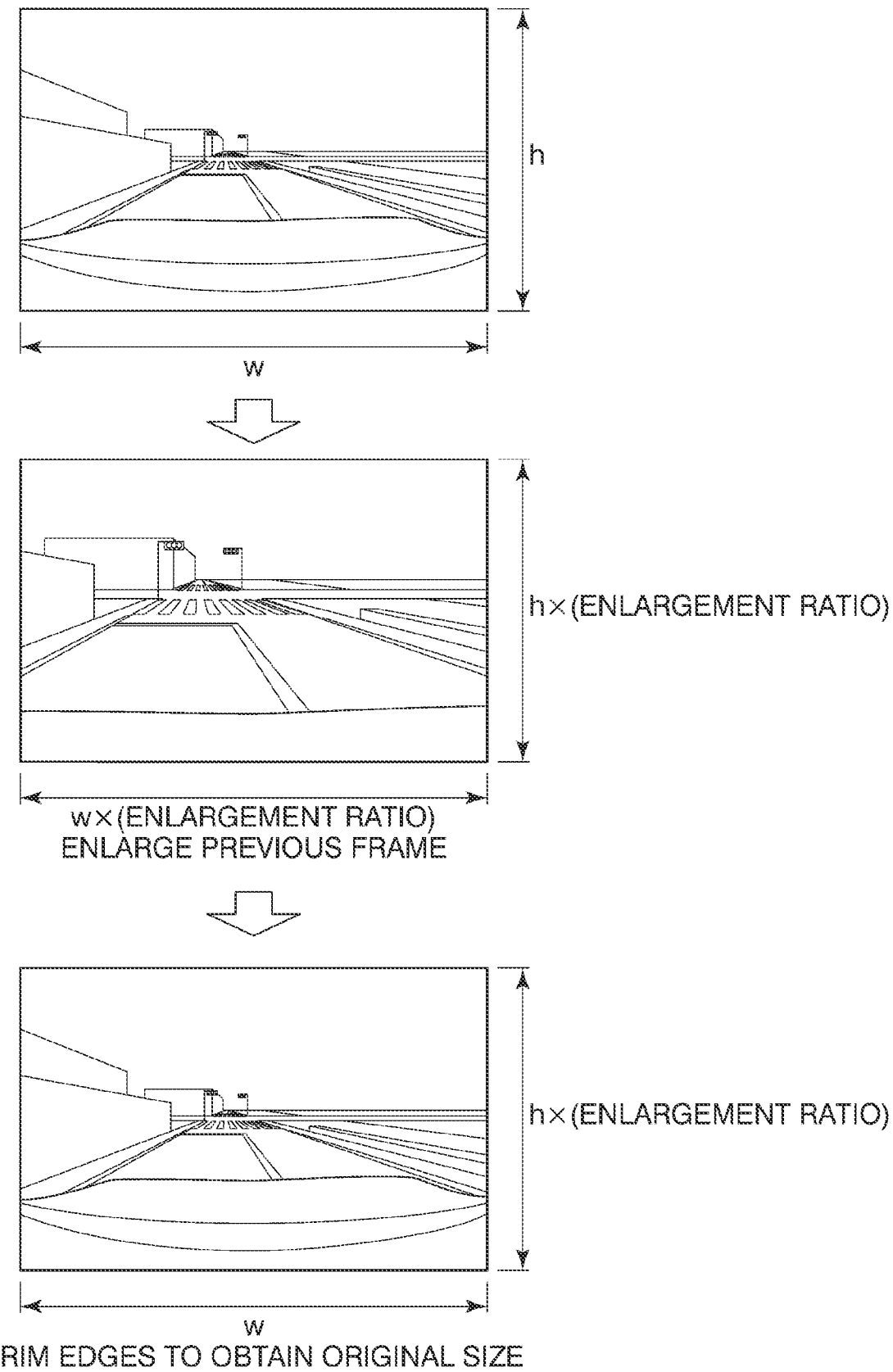
FIG. 5 is a diagram for describing a method of correcting a previous frame to calculate a difference image.

FIG. 5 is a diagram for describing a method of correcting the previous frame to calculate the difference image DI. In FIG. 5, h represents the height of the frame, and w represents the horizontal width of the frame. As illustrated in FIG. 5, the difference calculation unit 120 enlarges the previous frame by an enlargement ratio that depends on the movement distance of the vehicle M measured between the previous time point and the current time point. Since the size of the enlarged previous frame is larger than before the enlargement, the difference calculation unit 120 returns the size of the enlarged previous frame to its original size by trimming the edges of the enlarged previous frame.

The difference calculation unit 120 may correct the previous frame by considering the yaw rate of the vehicle M in a photography interval between the previous frame and the current frame, in addition to the speed of the vehicle M in the photography interval between the previous frame and the current frame. More specifically, the difference calculation unit 120 may calculate the difference between the yaw angle of the vehicle M at the time of acquisition of the previous frame and the yaw angle of the vehicle M at the time of acquisition of the current frame, based on the yaw rate in the photography interval, and align the previous frame with the current frame by shifting the previous frame in the yaw direction by an angle corresponding to the calculated difference.

Figure 6:
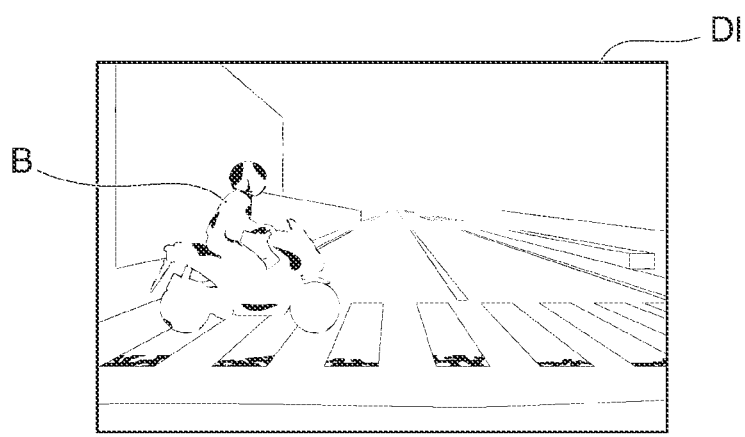
FIG. 6 is a diagram illustrating an example of the difference image calculated by a difference calculation unit.

FIG. 6 is a diagram illustrating an example of the difference image DI calculated by the difference calculation unit 120. After the difference calculation unit 120 aligns the previous frame with the current frame, the difference calculation unit 120 calculates a difference between pixel values of the previous frame and the current frame. When the difference value calculated for each pixel is equal to or larger than a defined value, the difference calculation unit 120 assigns, to the pixel, a first value indicating that the pixel is a candidate for a moving object. On the other hand, when the difference value calculated is smaller than the defined value, the difference calculation unit 120 assigns, to the pixel, a second value indicating that the pixel is not a candidate for a moving object. As illustrated in FIG. 6, it is understood that the motorbike B is detected as a moving object in the difference image DI calculated by the difference calculation unit 120.

The grid extraction unit 130 sets a grid for a plurality of pixels within the difference image DI calculated by the difference calculation unit 120, and extracts the grid when the density (ratio) of pixels with the first value in each set grid is equal to or larger than a threshold value.

Figure 7:
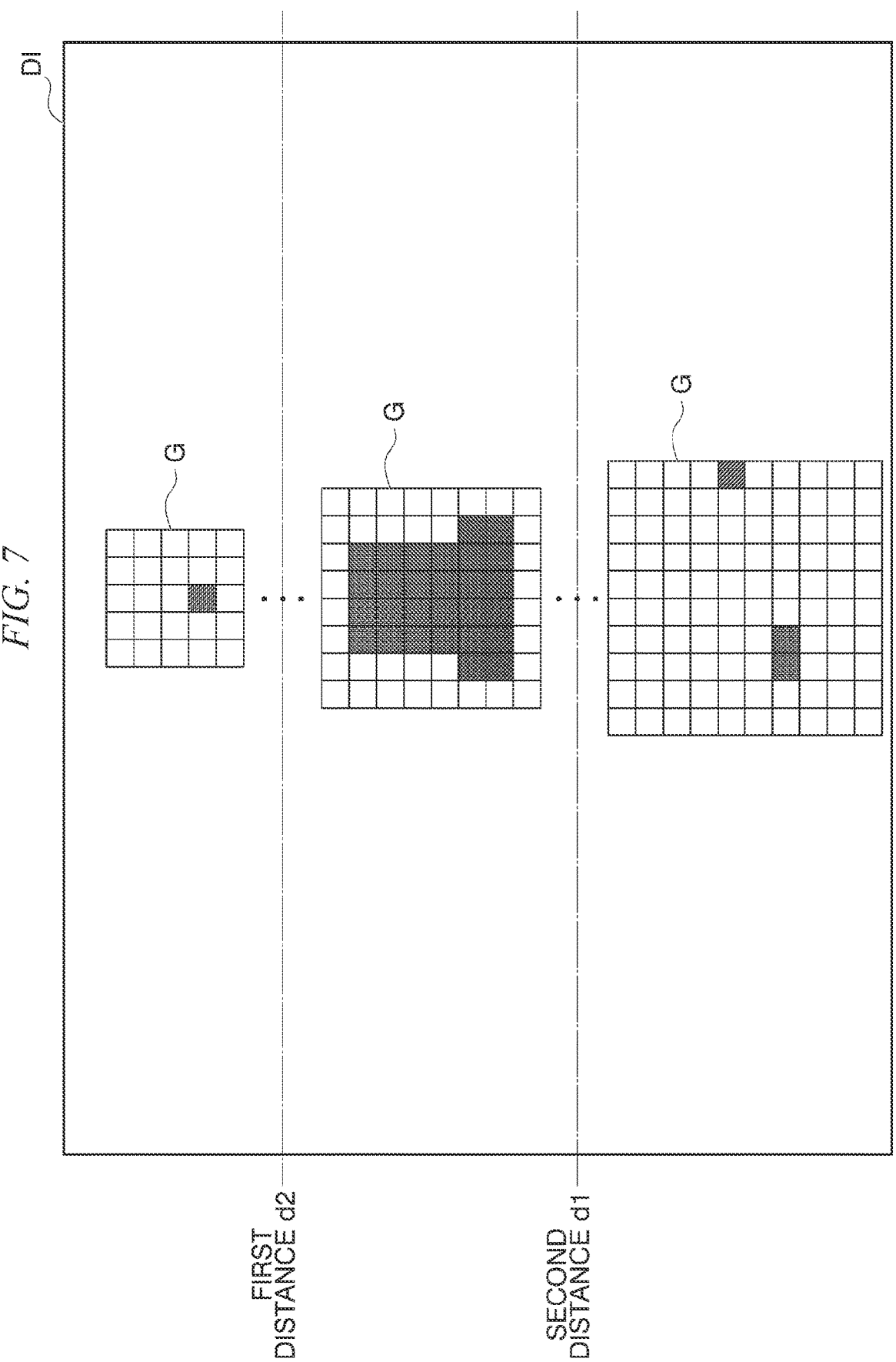
FIG. 7 is a diagram illustrating an example of the configuration of a grid G set by a grid extraction unit.

FIG. 7 is a diagram illustrating an example of the configuration of the grid set by the grid extraction unit. In FIG. 7, G represents a set of a plurality of pixels defined as a grid in the difference image DI. As illustrated in FIG. 7, for example, the grid extraction unit 130 sets the size of the grid G to 10×10 pixels (example of "first size") for a region having a distance from the camera 10 equal to or smaller than a first distance (for example, 10 m), sets the size of the grid G to 8×8 pixels (example of "second size") for a region having a distance from the camera 10 larger than the first distance and equal to or smaller than a second distance (for example, 20 m), and sets the size of the grid G to 5×5 pixels (example of "third size") for a region having a distance from the camera 10 larger than the second distance. This is because a change in the region photographed by the camera 10 becomes smaller as the distance from the camera 10 becomes further, and thus the size of grid G is required to be set finer in order to detect a moving object. It is possible to detect a moving object more accurately by setting the size of the grid G according to the distance from the camera 10 in the difference image DI.

Figure 8:
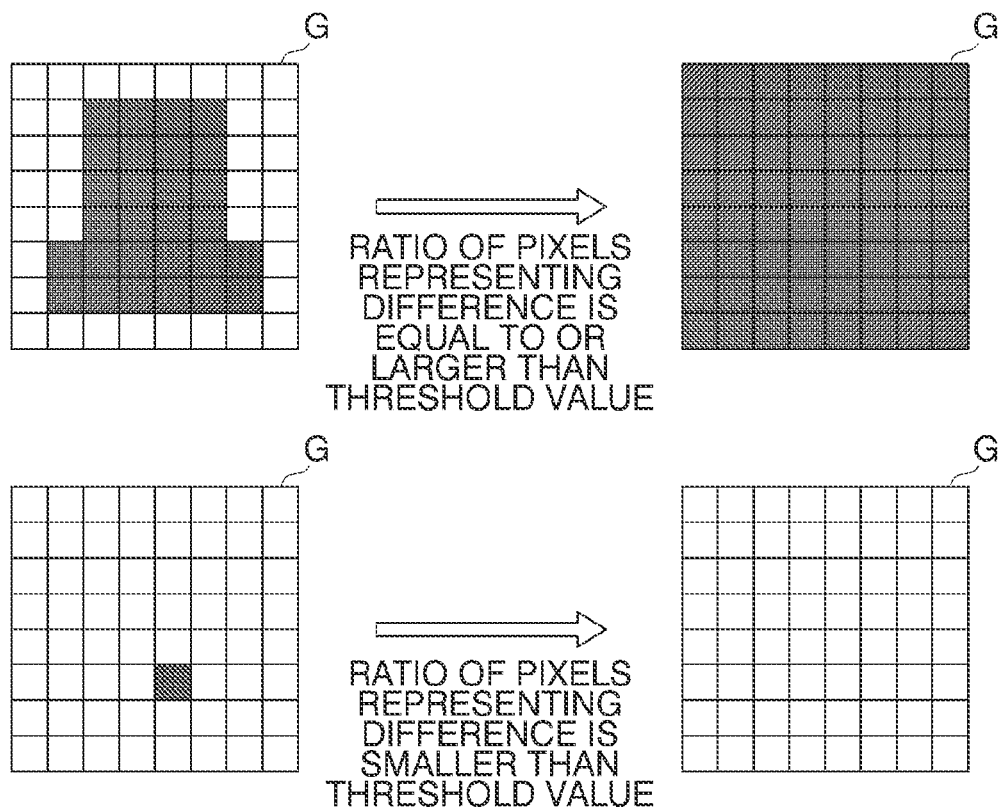
FIG. 8 is a diagram illustrating an example of a method of extracting the grid G by the grid extraction unit.

FIG. 8 is a diagram illustrating an example of a method of extracting the grid G by the grid extraction unit 130. The grid extraction unit 130 determines, for each of the plurality of grids G, whether or not the density of pixels with the first value is equal to or larger than a threshold value (for example, 85%). As illustrated in the upper part of FIG. 8, regarding a grid G for which the density of pixels with the first value is determined to be equal to or larger than the threshold value, the grid extraction unit 130 extracts the entire pixels forming the grid G (set pixels to first value). On the other hand, as illustrated in the lower part of FIG. 8, regarding a grid G for which the density of pixels with the first value is determined to be smaller than the threshold value, the grid extraction unit 130 discards the entire pixels forming the grid G (set pixels to second value).

In the above description, the grid extraction unit 130 determines, for each of the plurality of grids G, whether or not the density of pixels with the first value is equal to or larger than a single threshold value. However, the present invention is not limited to such a configuration, and the grid extraction unit 130 may change the threshold value according to the distance from the camera 10 in the difference image DI. For example, the grid extraction unit 130 may set the threshold value higher as the distance from the camera 10 becomes smaller. This is because in general as the distance from the camera 10 becomes smaller, a change in the region photographed by the camera 10 becomes larger, which is likely to cause an error. Further, the grid extraction unit 130 may perform determination by using any statistical value based on the pixels with the first value in addition to the density of pixels with the first value.

Figure 9:
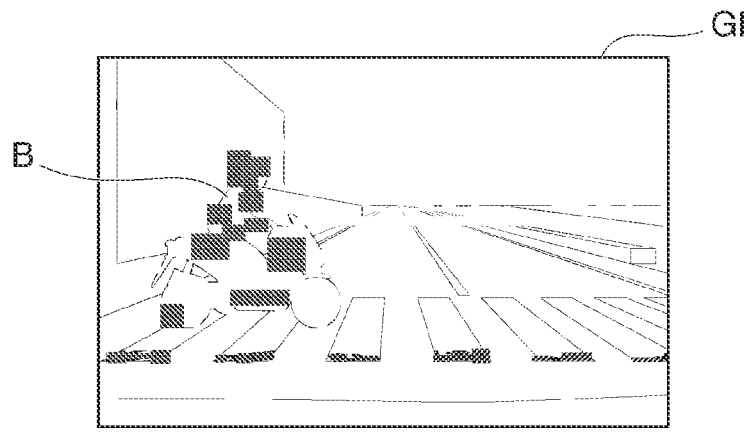
FIG. 9 is a diagram illustrating an example of a grid image GI calculated by the grid extraction unit.

The grid extraction unit 130 calculates a grid image GI by applying, to the difference image DI, processing (grid replacement processing) that sets, to the first value, the entire pixels of the grid for which the density of pixels with the first value is equal to or larger than a threshold value. FIG. 9 is a diagram illustrating an example of the grid image GI calculated by the grid extraction unit 130. The elements forming the difference image DI illustrated in FIG. 8 are pixels, whereas the elements forming the grid image GI illustrated in FIG. 9 are grids. As illustrated in FIG. 9, it is understood that grids representing the motorbike B are detected in the grid image GI by applying grid replacement processing to the difference image DI. That is, the moving object detection unit 140 detects grids represented in the grid image GI as a moving object.

Figure 10:
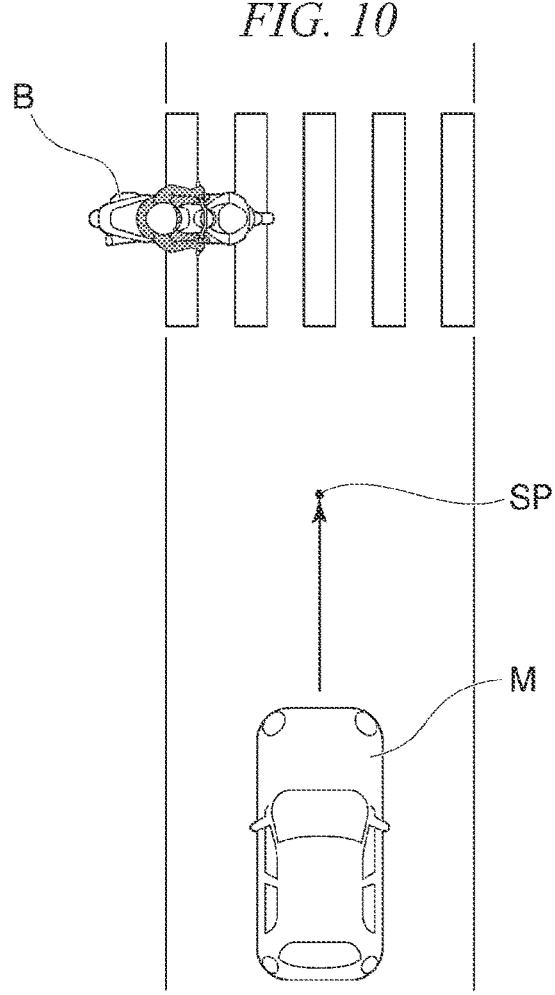
FIG. 10 is a diagram illustrating an example of an operation to be executed by a traveling control device.

The result of detecting a moving object by the moving object detection unit 140 is transmitted to the traveling control device 200, and the traveling control device 200 controls traveling of the vehicle M on the basis of the received detection result. FIG. 10 is a diagram illustrating an example of an operation to be executed by the traveling control device 200. FIG. 10 illustrates an exemplary situation in which the moving object detection unit 140 has detected the motorbike B as a moving object. In this case, the traveling control device 200 generates a trajectory of the vehicle M so as to avoid collision with the moving object detected by the moving object detection unit 140, and causes the vehicle M to travel along the generated trajectory. In the case of FIG. 10, the traveling control device 200 controls the vehicle M so as to stop at a location SP in front of a crossing in which the motorbike B is traveling. As a result, it is possible to preferably use the result of detection by the moving object detection device 100 for autonomous driving or driving assistance for the vehicle M. The traveling control device 200 is an example of "driving assistance device".

In the above description, the result of detection by the moving object detection device 100 is used for autonomous driving. However, the present invention is not limited to such a configuration, and the result of detection by the moving object detection device 100 can also be used as driving assistance information to be provided to an occupant who performs manual driving, for example.

Figure 11:
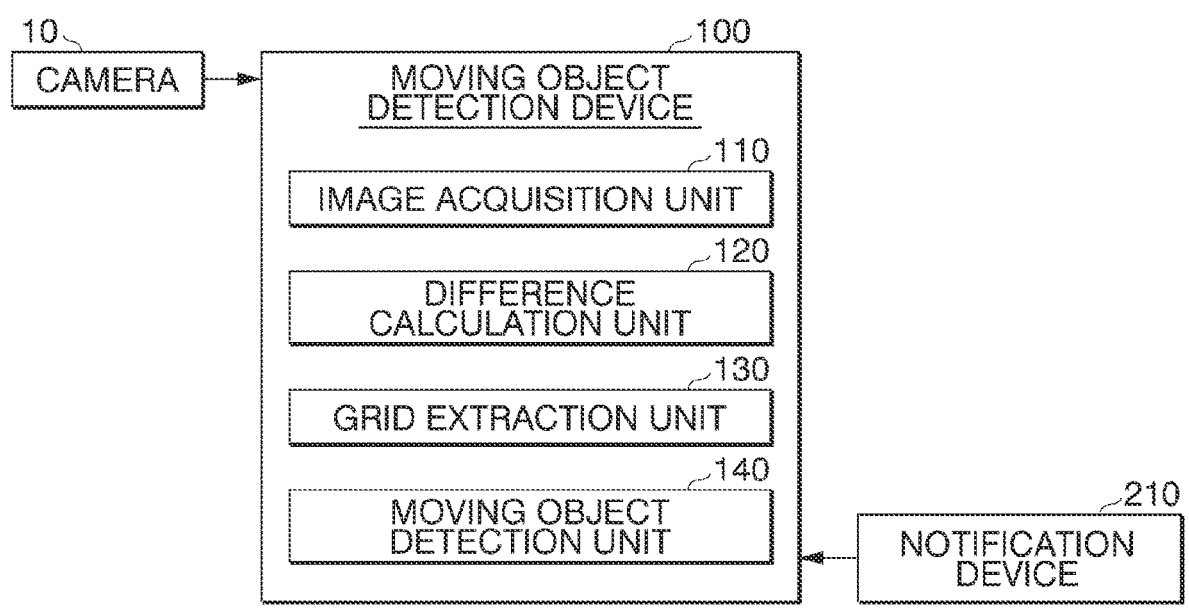
FIG. 11 is a diagram illustrating another example of the configuration and peripheral devices of the moving object detection device.

FIG. 11 is a diagram illustrating another example of the configuration and peripheral devices of the moving object detection device 100. In FIG. 11, the moving object detection device 100 is configured to communicate with a reporting device 210 instead of the traveling control device 200. Other configurations are similar to those illustrated in FIG. 1.

The reporting device 210 is, for example, a display device, speaker, vibrator, light emitting device for outputting information to the occupant of the vehicle M. The reporting device 210 reports information indicating existence of a moving object in front of the vehicle M to the occupant of the vehicle M. The reporting device 210 is an example of "driver assistance device".

Figure 12:
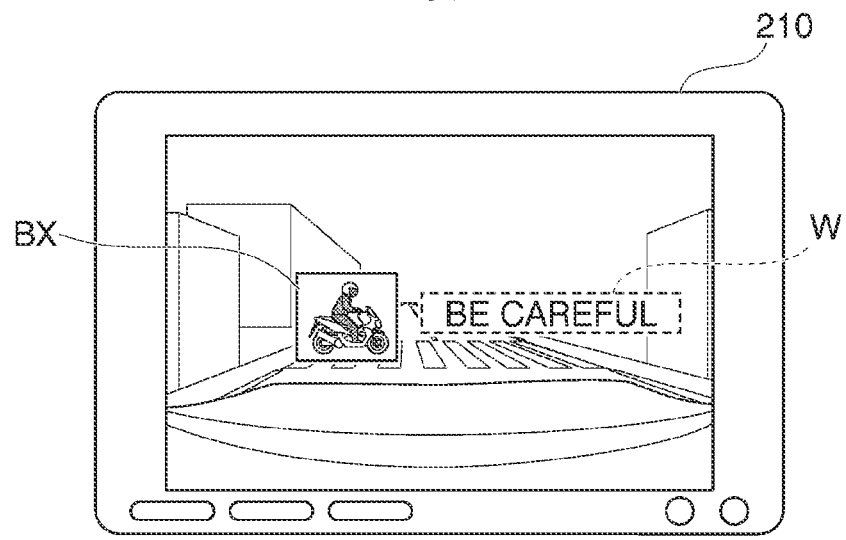
FIG. 12 is a diagram illustrating an example of an operation to be executed by a reporting device.

FIG. 12 is a diagram illustrating an example of an operation to be executed by the reporting device 120. FIG. 12 illustrates an exemplary situation in which the reporting device 210 functions as a navigation device of the vehicle M. As illustrated in FIG. 12, when the grid extraction unit 130 has detected a moving object, the reporting device 210 surrounds the detected moving object by a bounding box BX to display the moving object on the screen, for example.

In this case, the reporting device 210 may further display a warning message W indicating that there is a moving object in front of the vehicle M, or report information indicating that there is a moving object in front of the vehicle M by sound. With this processing, it is possible to provide useful driving assistance information to an occupant manually driving the vehicle M.

Figure 13:
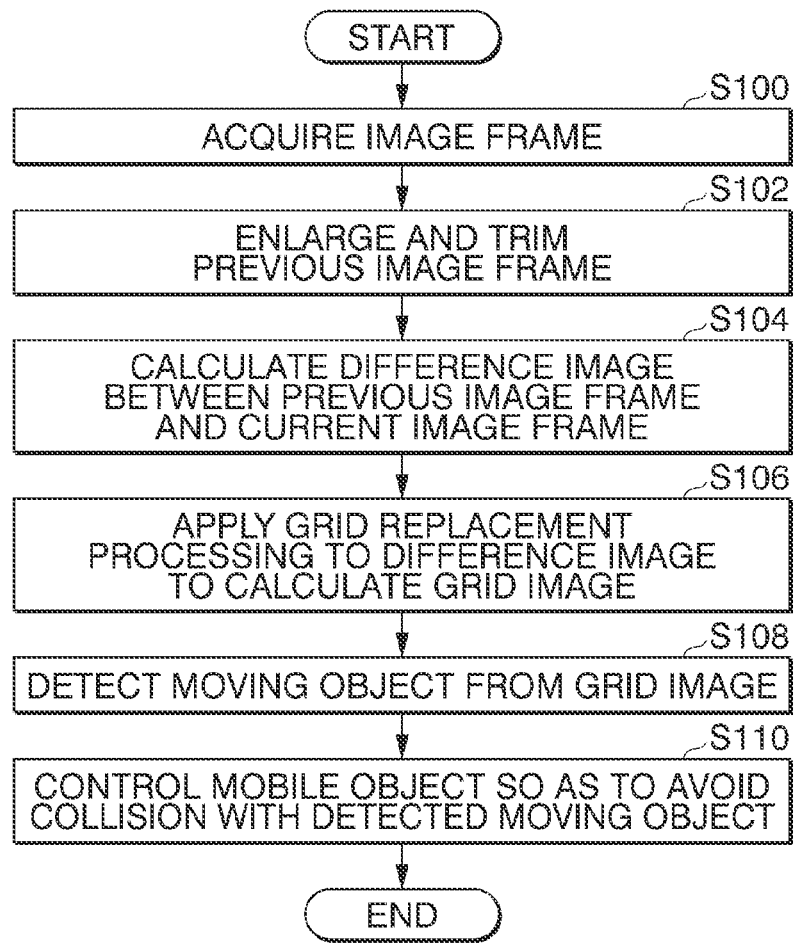
FIG. 13 is a diagram illustrating an example of a flow of processing to be executed by the moving object detection device.

Next, referring to FIG. 13, description is given of a flow of processing to be executed by the moving object detection device 100. FIG. 13 is a diagram illustrating an example of the flow of processing to be executed by the moving object detection device 100.

First, the image acquisition unit 110 acquires a current image frame that is an image frame representing the surrounding condition of the vehicle M photographed by the camera 10 (Step S100). Next, the difference calculation unit 120 enlarges the previous image frame acquired at the previous step of the current image frame with respect to the vanishing point VP on the basis of the speed of the vehicle M between the previous image frame and the current image frame, and trims the edges the enlarged previous frame so that the size of the previous frame matches the size of the current image frame (Step S102).

Next, the difference calculation unit 120 calculates a difference image between the previous image frame and the current image frame (Step S104). More specifically, the difference calculation unit 120 calculates a difference value between pixels of the previous image frame and the current image frame. When the calculated difference value is equal to or larger than a defined value, the difference calculation unit 120 assigns a first value to the pixel, whereas when the calculated difference value is smaller than the defined value, the difference calculation unit 120 assigns a second value to the pixel.

Next, the grid extraction unit 130 sets grids G for a plurality of pixels in the calculated difference image, and extracts a grid G for which the density of pixels with the first value is equal to or larger than a threshold value, to thereby calculate a grid image GI (Step S106). Next, the moving object detection unit 140 detects the grid G represented in the grid image GI as a moving object (Step S108). Next, the traveling control device 200 controls traveling of the vehicle M so as to avoid collision with the moving object detected by the moving object detection unit 140 (Step S110). In this manner, the processing of this flow chart is finished.

According to the first embodiment described above, a difference image is calculated for image frames photographed by a camera in time series, grids with different sizes are set for a plurality of pixels in the calculated difference image, and existence of a moving object is detected for each set grid. With this processing, it is possible to easily detect a moving object existing near a vehicle immediately.

Second Embodiment

The first embodiment detects the grid G shown in the grid image GI calculated from the difference image DI as a moving object. However, the grid G shown in the grid image GI is not always a moving object, and may include a stationary object such as a crossing. The moving object detection device 100 according to a second embodiment improves the accuracy of detecting a moving object by comparing the plurality of calculated grid images GI. The functional configuration of the moving object detection device 100 according to the second embodiment is similar to that of the first embodiment, and thus description thereof is omitted here.

In the second embodiment, in order to detect a moving object from a grid image more accurately, the moving object detection unit 140 detects a moving object by comparing the plurality of grid images obtained for different time points.

Figure 14:
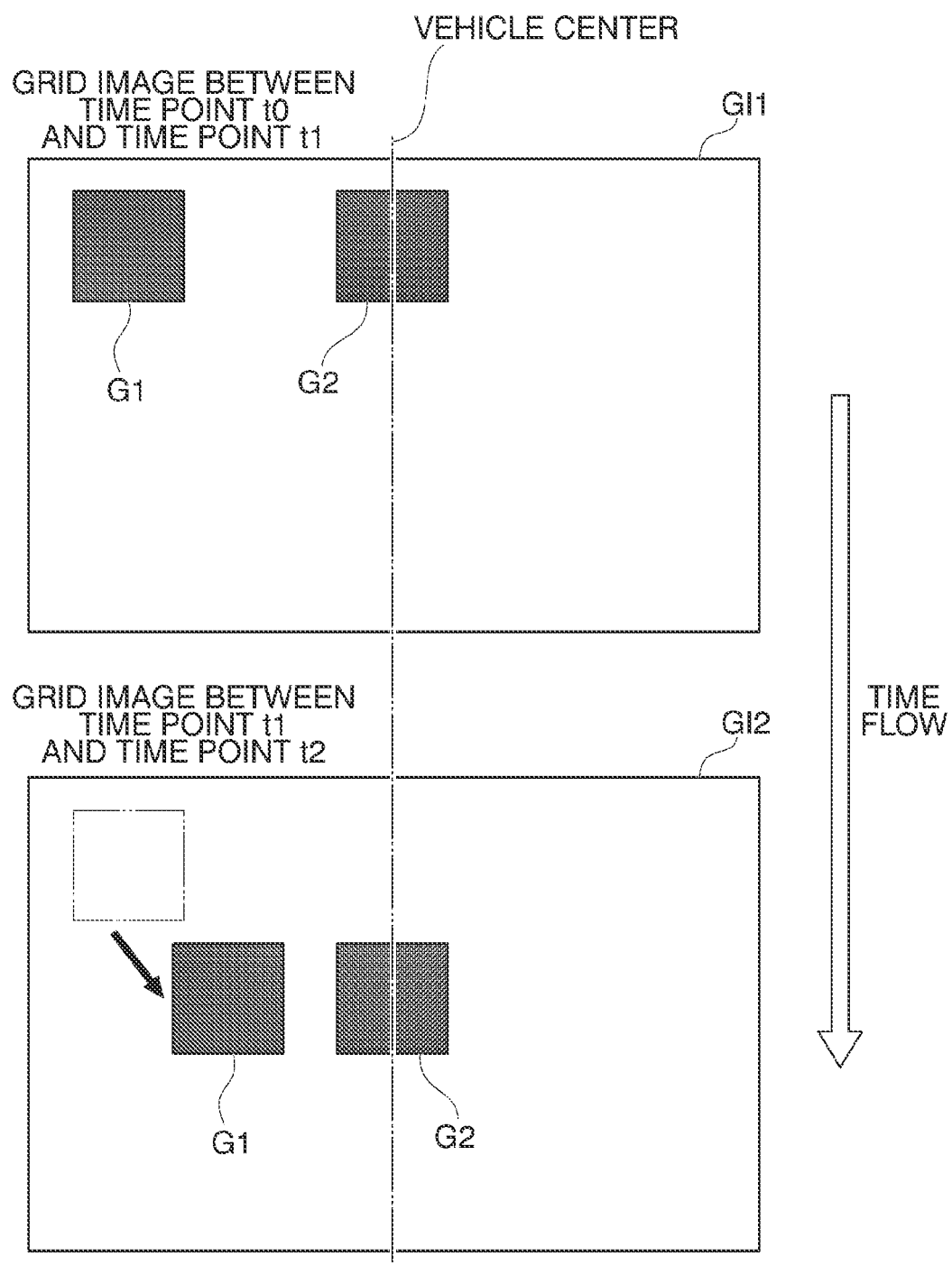
FIG. 14 is a diagram for describing an operation to be executed by a moving object detection unit according to a second embodiment.

FIG. 14 is a diagram for describing an operation to be executed by the moving object detection unit 140 according to the second embodiment. The upper part of FIG. 14 represents a grid image GI1 calculated from a difference image between a time point t0 and a time point t1 after the time point t0, and the lower part of FIG. 14 represents a grid image GI2 calculated from a difference image between the time point t1 and a time point t2 (for example, current time point) after the time point t1. The reference numerals G1 and G2 each represent a grid for which the density of pixels with the first value is determined to be equal to or larger than the threshold value. The time point t0 is an example of "first time point", the time point t1 is an example of "second time point", and the time point t3 is an example of "third time point".

The moving object detection unit 140 compares a grid G1(G2) in the grid image GI1 with a grid G1(G2) in the grid image GI2 to detect a moving object existing near the vehicle M. More specifically, the moving object detection unit 140 first acquires information on the speed and yaw rate of the vehicle M in a period between the time point t1 and the time point t2. Next, the moving object detection unit 140 identifies the position of the grid image GI2 corresponding to the grid G in the grid image GI1 on the basis of the acquired information on the speed and yaw rate. Next, the moving object detection unit 140 compares the grid G in the grid image GI1 with the grid G existing at the identified position of the grid image GI2 to determine that the grids G indicate the same object when those shapes or the densities of pixels with the first value match each other (or are similar to each other). FIG. 14 illustrates an example in which the grid G1 in the grid image GI1 corresponds to the grid G1 in the grid image GI2, and the grid G2 in the grid image GI1 corresponds to the grid G2 in the grid image GI2.

Next, the moving object detection unit 140 determines whether or not the grid G in the grid image GI2 has moved in the image center direction with the grid G corresponding to the grid image GI1 serving as a reference. The moving object detection unit 140 detects the grid G as a moving object when the moving object detection unit 140 has determined that the grid G in the grid image GI2 has moved in the image center direction. In the example of FIG. 14, the moving object detection unit 140 detects the grid G1 as a moving object because the moving object detection unit 140 determines that the grid G1 in the grid image GI2 has moved in the image center direction (that is, lower right direction) with the grid G1 in the grid image GI1 serving as a reference. On the other hand, as illustrated in FIG. 14, the grid G2 existing at the center of the image has not moved in the image center direction, and thus the moving object detection unit 140 does not detect the grid G2 as a moving object. However, in general, the movement amount of an object existing at the center of the image tends to be underestimated in terms of appearance through frames, and thus the moving object detection unit 140 may detect the grid G2 as a monitoring target object that is likely to collide with the vehicle M.

Figure 15:
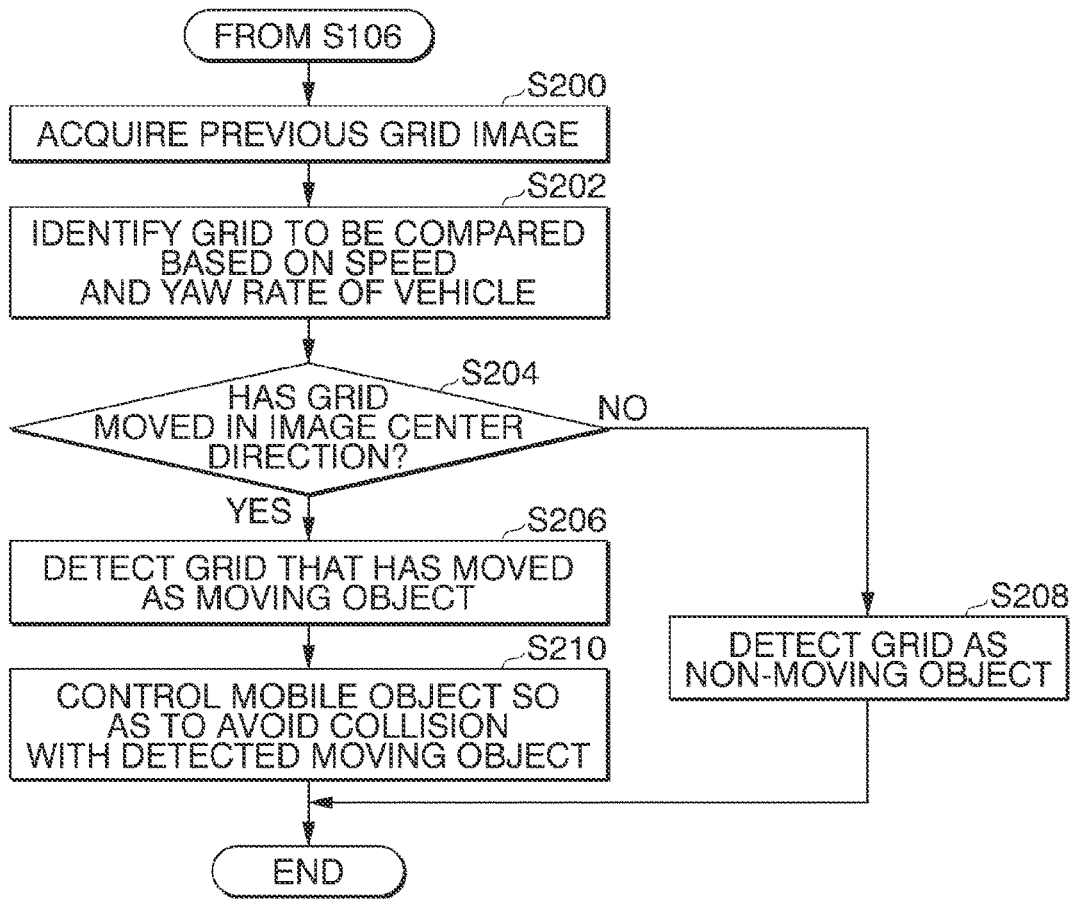
FIG. 15 is a diagram illustrating an example of a flow of processing to be executed by a moving object detection device according to the second embodiment.

Next, referring to FIG. 15, description is given of a flow of processing to be executed by the moving object detection device 100. FIG. 15 is a diagram illustrating an example of the flow of processing to be executed by the moving object detection device 100 according to the second embodiment. The processing steps until Step S106 are similar to those of the flow chart of the first embodiment illustrated in FIG. 13, and thus description thereof is omitted here.

In Step S106, when the grid extraction unit 130 has calculated a current grid image GI, the moving object detection unit 140 acquires the previous grid image GI calculated one cycle before (Step S200). Next, the moving object detection unit 140 identifies a grid G to be compared on the basis of the speed and yaw rate of the vehicle M between the time of calculating the previous grid image GI and the time of calculation of the current grid image GI (Step S202).

Next, the moving object detection unit 140 determines whether or not the grid G in the current grid image GI has moved in the image center direction with the grid G corresponding to the previous grid image GI serving as a reference (Step S204). When the moving object detection unit 140 has determined that the grid G in the current grid image GI has moved in the image center direction with the grid G corresponding to the previous grid image GI serving as a reference, the moving object detection unit 140 detects the grid G as a moving object (Step S206).

On the other hand, when the moving object detection unit 140 has not determined that the grid G in the current grid image GI has moved in the image center direction with the grid G corresponding to the previous grid image GI serving as a reference, the moving object detection unit 140 detects the grid G as a non-moving object (Step S208). Next, the traveling control device 200 controls traveling of the vehicle M so as to avoid collision with the moving object detected by the moving object detection unit 140 (Step S210). In this manner, the processing of this flow chart is finished.

According to the second embodiment described above, a corresponding grid in a grid image calculated at the previous time point and a grid image calculated at the current time point are identified on the basis of the speed and yaw rate of the vehicle M, and when the identified grid has moved in the vehicle center direction with respect to the previous time point, the grid is detected as a moving object. As a result, it is possible to detect a moving object from a grid image more accurately.

Third Embodiment

The first embodiment detects a grid G shown in the grid image GI calculated from the difference image DI as a moving object. However, the grid G shown in the grid image GI is not always a moving object, and may include a stationary object such as a crossing. The moving object detection device 100 according to a third embodiment improves the accuracy of detecting a moving object by comparing the grid G shown in the grid image GI with a defined size of the detected object (such has pedestrian, motorbike, or vehicle).

Figure 16:
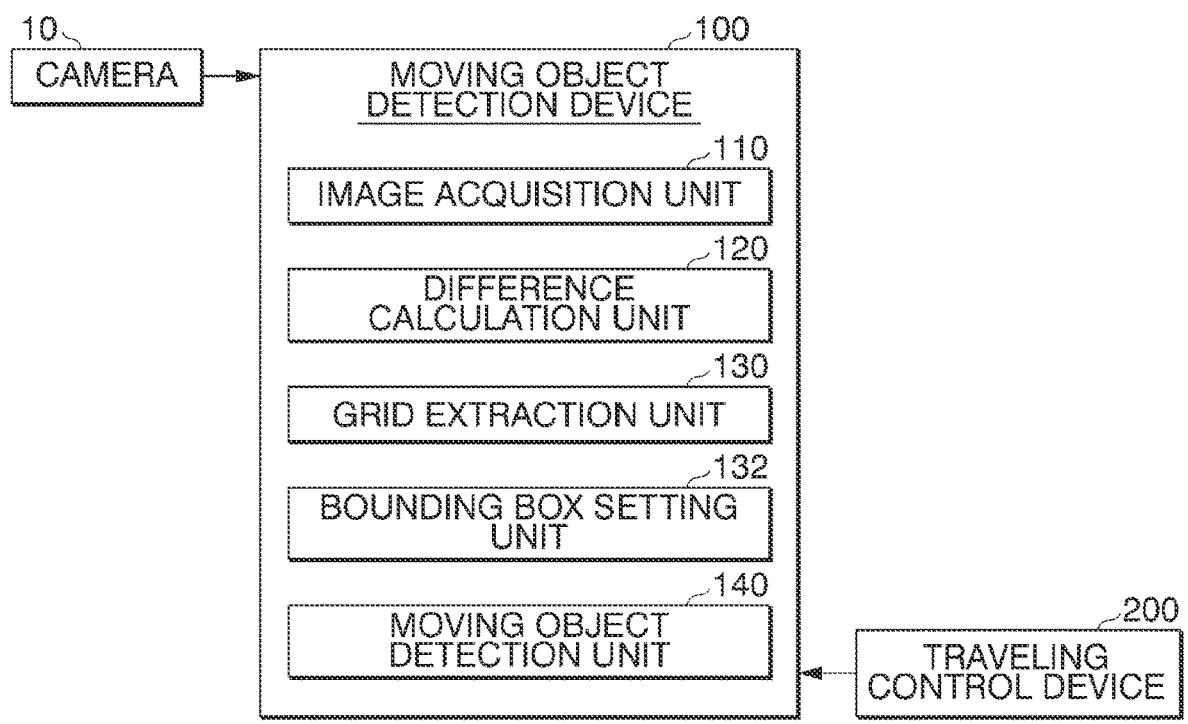
FIG. 16 is a diagram illustrating an example of the configuration and peripheral devices of a moving object detection device according to a third embodiment.

FIG. 16 is a diagram illustrating an example of the configuration and peripheral devices of the moving object detection device 100 according to the third embodiment. As illustrated in FIG. 16, the moving object detection device 100 includes a bounding box setting unit 132 in addition to the moving object detection device 100 according to the first embodiment. The bounding box setting unit 132 retrieves a set of grids G extracted by the grid extraction unit 130 and satisfying a predetermined criterion, and sets a bounding box for the retrieved set of grids G.

Figure 17:
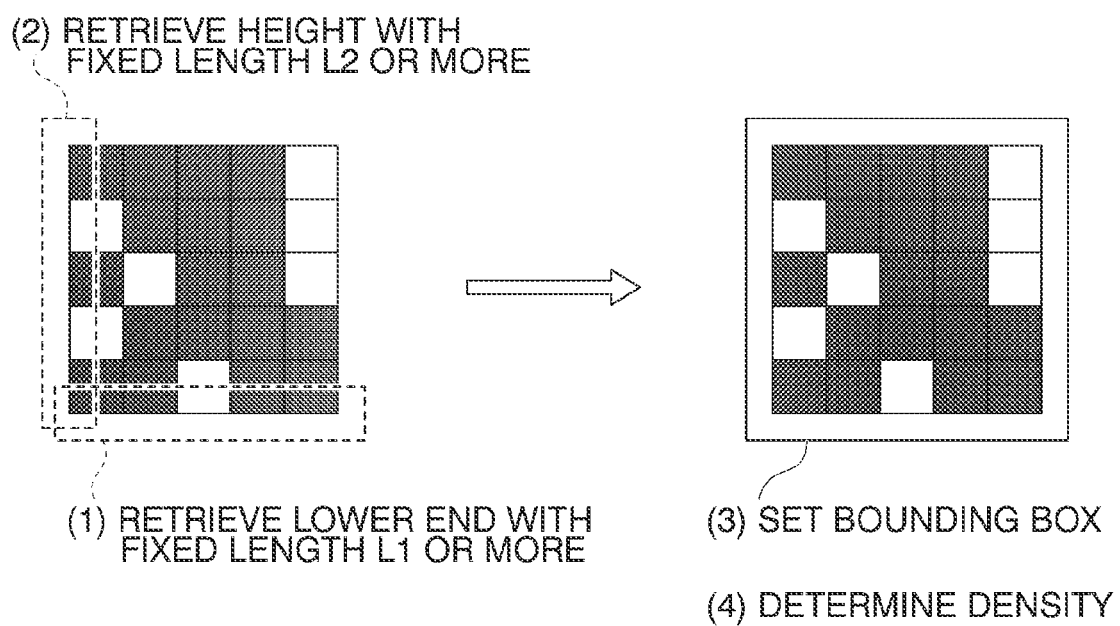
FIG. 17 is a diagram illustrating an example of a method of retrieving the grid G to be executed by a bounding box setting unit.

FIG. 17 is a diagram illustrating an example of a method of retrieving the grid G to be executed by the bounding box setting unit 132. The bounding box setting unit 132 first retrieves a set of grids G having a lower end with a fixed length L1 or more from the grid image GI calculated by the grid extraction unit 130. In this case, as illustrated in the left part of FIG. 17, in order for a set of grids G to be determined to have a lower end with a fixed length L1 or more, the set of grids G is not necessarily required to include a complete set of grids G, and a set of grids G may be determined to have a lower end with a fixed length L1 or more when the density of grids G included in the lower end is equal to or larger than a reference value.

Next, when the bounding box setting unit 132 has identifies a set of grids G having a lower end with the fixed length L1 or more, the bounding box setting unit 132 determines whether or not the set of grids G has a height with a fixed length L2 or more. That is, it is possible to determine which one of objects such as a pedestrian, a motor bike, or a vehicle a set of grids G corresponds to by determining whether or not the set of grids G has a lower end with a fixed length L1 or more and a height with a fixed length L2 or more. In this case, a combination of the fixed length L1 of the lower end and the fixed length L2 of the height is set as values unique to an object such as a pedestrian, a motor bike, or a vehicle.

Next, when the bounding box setting unit 132 has identified the set of grids G having a lower end with the fixed length L1 or more and a height with the fixed length L2 or more, the bounding box setting unit 132 sets a bounding box for the set of grids G. Next, the bounding box setting unit 132 determines whether or not the density of grids G included in the set bounding box is equal to or larger than a threshold value. When the bounding box setting unit 132 has determined that the density of grids G included in the set bounding box is equal to or larger than the threshold value, the bounding box setting unit 132 detects the bounding box as a moving object. By executing bounding box setting and density determination, it is possible to check whether or not the identified set of grids G is a real object.

In this manner, the bounding box setting unit 132 retrieves a set of grids G satisfying a predetermined criterion from the grid image GI, but retravel of the set of grids G puts a larger processing load in some cases. Thus, the bounding box setting unit 132 may retrieve a region important for traveling of the vehicle M preferentially in order to alleviate the processing load on retravel of the set of grids G.

Figure 18:
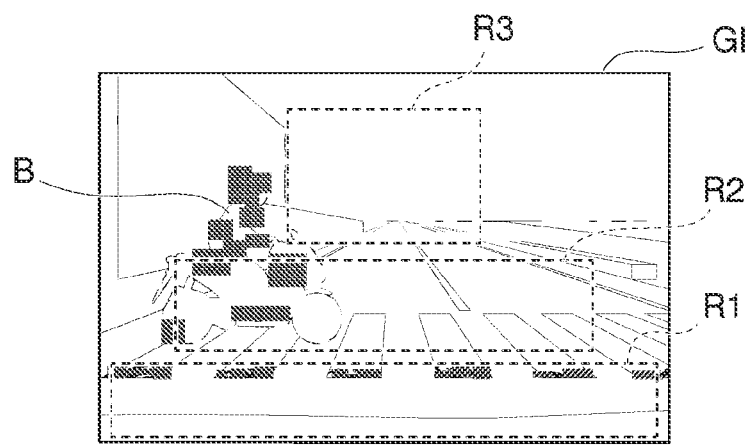
FIG. 18 is a diagram illustrating an example of the range of retrieving the grid G by the bounding box setting unit.

FIG. 18 is a diagram illustrating an example of the range of retrieving the grid G by the bounding box setting unit 132. In FIG. 18, the reference numeral R1 indicates the range of retrieving the grid G at a short distance from the vehicle M, the reference numeral R2 indicates the range of retrieving the grid G at an intermediate distance from the vehicle M, and the reference numeral R3 indicates the range of retrieving the grid G at a long distance from the vehicle M. As illustrated in FIG. 18, the bounding box setting unit 132 may search the entire region of the grid image GI in the range R1 of the short distance from the vehicle M, whereas the bounding box setting unit 132 may search only the center part of the grid image GI in the range R2 of the intermediate distance and the range R2 of the long distance. In this manner, it is possible to search a region important for traveling of the vehicle M preferentially, and alleviate the processing load on retrieval of the set of grids G.

In the exemplary description of FIG. 18, the range of retrieving the grid G is divided into three parts, but the present invention is not limited to such a configuration. For example, the bounding box setting unit 132 may retrieve the grid G in the search range with two or four or more parts, or may retrieve the grid G in such a manner as to narrow down the search width of a single search range continuously to the center part thereof.

Figure 19:
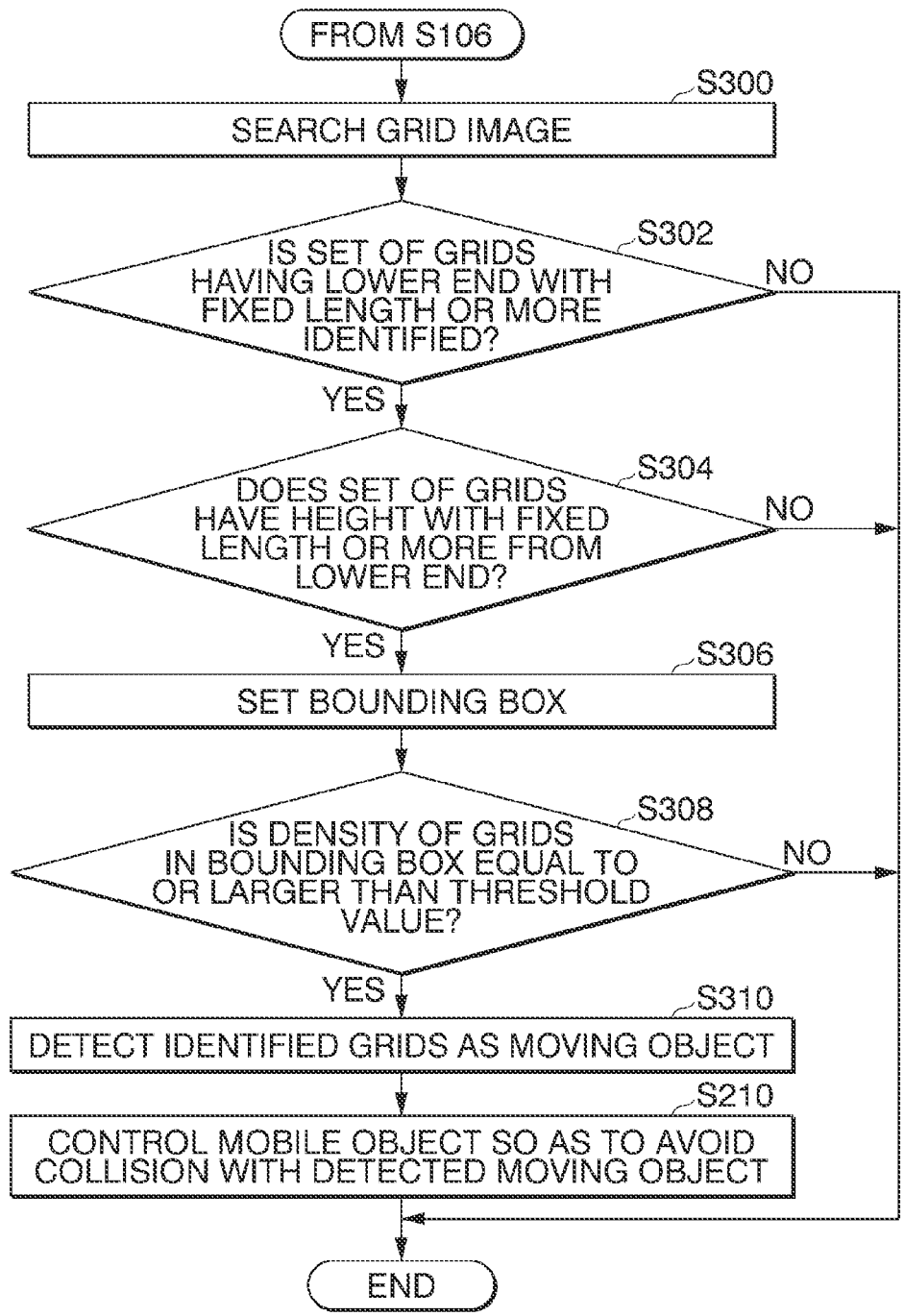
FIG. 19 is a diagram illustrating an example of a flow of processing to be executed by a moving object detection device according to the third embodiment.

Next, referring to FIG. 19, description is given of a flow of processing to be executed by the moving object detection device 100. FIG. 19 is a diagram illustrating an example of the flow of processing to be executed by the moving object detection device 100 according to the third embodiment. The processing steps until Step S106 are similar to those of the flow chart of the first embodiment illustrated in FIG. 13, and thus description thereof is omitted here.

In Step S106, when the grid extraction unit 130 has calculated the grid image GI, the bounding box setting unit 132 retrieves a set of grids G having a lower end with a fixed length L1 or more from the grid image GI (Step S300). When the bounding box setting unit 132 has not retrieved a set of grids G having a lower end with a fixed length L1 or more from the grid image GI, the bounding box setting unit 132 finishes the processing of this flow chart.

On the other hand, when the bounding box setting unit 132 has retrieved a set of grids G having a lower end with the fixed length L1 or more from the grid image GI, the bounding box setting unit 132 determines whether or not the set of grids G has a height with a fixed length L2 or more with the lower end thereof serving as a reference (Step S304). When it is not determined that the set of grids G has a height with the fixed length L2 or more, the bounding box setting unit 132 finishes the processing of this flow chart.

On the other hand, when it is determined that the set of grids G has a height with the fixed length L2 or more, the bounding box setting unit 132 sets a bounding box surrounding the set of grids G (Step S306). Next, the bounding box setting unit 132 determines whether or not the density of grids G in the set bounding box is equal to or larger than a threshold value (Step S308). When it is not determined that the density of grids G in the set bounding box is equal to or larger than the threshold value, the bounding box setting unit 132 finishes the processing of this flow chart.

On the other hand, when it is determined that the density of grids G in the set bounding box is equal to or larger than the threshold value, the moving object detection unit 140 detects the bounding box as a moving object (Step S310). Next, the traveling control device 200 controls traveling of the vehicle M so as to avoid collision with the moving object detected by the moving object detection unit 140 (Step S210). In this manner, the processing of this flow chart is finished.

According to the third embodiment described above, a set of grids satisfying a predetermined criterion is retrieved from a grid image, a bounding box is set for the retrieved set of grids, and a moving object is detected on the basis of whether or not the density of the set bounding box is equal to or larger than a threshold value. Therefore, it is possible to detect a moving object from a grid image more accurately.

The embodiments described above can be represented in the following manner.

A moving object detection device including a storage medium storing computer-readable commands and a processor connected to the storage medium, the processor executing the computer-readable commands to: acquire image data including a plurality of frames representing a surrounding condition of a mobile object, which are photographed by a camera mounted in the mobile object in time series; calculate a difference image between the plurality of frames by calculating differences between the plurality of frames and binarizing the differences using a first value and a second value; extract a grid for which the density of pixels with the first value is equal to or larger than a first threshold value from among a plurality of grids set in the difference image; and detect the extracted grid as a moving object, in which each of the plurality of grids is set such that as a distance from the camera becomes larger, the grid has a smaller pixel size.

This concludes the description of the embodiment for carrying out the present invention. The present invention is not limited to the embodiment in any manner, and various kinds of modifications and replacements can be made within a range that does not depart from the gist of the present invention.

What is claimed is:

1. A moving object detection device comprising a non-transitory storage medium storing computer-readable commands and a processor connected to the non-transitory storage medium, the computer-readable commands, when executed, causing the processor to:
   acquire image data including a plurality of frames representing a surrounding condition of a mobile object, which are photographed by a camera mounted in the mobile object in time series;
   calculate a difference image between the plurality of frames by calculating differences between the plurality of frames and binarizing the differences using a first value and a second value;
   extract a grid for which a density of pixels with the first value is equal to or larger than a first threshold value from among a plurality of grids set in the difference image; and
   detect the extracted grid as a moving object,
   wherein each of the plurality of grids is set such that as a distance from the camera becomes larger, the grid has a smaller pixel size, and
   wherein the processor changes the first threshold value according to the distance between each of the plurality of grids and the camera.

2. The moving object detection device according to claim 1, wherein the processor enlarges a frame photographed at a previous time point on the basis of a speed of the mobile object in a photography interval for photographing the plurality of frames, and calculates a difference image between the enlarged frame photographed at the previous time point and a frame photographed at a current time point.

3. The moving object detection device according to claim 2, wherein the processor enlarges the frame photographed at the previous time point with respect to a vanishing point of the frame photographed at the previous time point.

4. The moving object detection device according to claim 1, wherein the processor corrects a frame photographed at a previous time point on the basis of a yaw rate of the mobile object in a photography interval for photographing the plurality of frames, and calculates a difference image between the corrected frame photographed at the previous time point and a frame photographed at a current time point.

5. A moving object detection device comprising a non-transitory storage medium storing computer-readable commands and a processor connected to the non-transitory storage medium, the computer-readable commands, when executed, causing the processor to:
   acquire image data including a plurality of frames representing a surrounding condition of a mobile object, which are photographed by a camera mounted in the mobile object in time series;
   calculate a difference image between the plurality of frames by calculating differences between the plurality of frames and binarizing the differences using a first value and a second value;
   extract a grid for which a density of pixels with the first value is equal to or larger than a first threshold value from among a plurality of grids set in the difference image; and
   detect the extracted grid as a moving object,
   wherein each of the plurality of grids is set such that as a distance from the camera becomes larger, the grid has a smaller pixel size,
   wherein the processor sets a size of each of the plurality of grids to a first size when the distance from the camera is equal to or smaller than a first distance, sets the size of each of the plurality of grids to a second size smaller than the first size when the distance from the camera is larger than the first distance and is equal to or smaller than a second distance, or sets the size of each of the plurality of grids to a third size smaller than the second size when the distance from the camera is larger than the second distance, and
   wherein grids of the first size, grids of the second size, and grids of the third size are set in advance in the difference image so as not to overlap with each other.

6. A system comprising:
   the moving object detection device according to claim 1; and
   a driving assistance device configured to execute driving assistance for the mobile object on the basis of the result of detection by the moving object detection device.

7. A moving object detection method comprising:
   acquiring image data including a plurality of frames representing a surrounding condition of a mobile object, which are photographed by a camera mounted in the mobile object in time series;
   calculating a difference image between the plurality of frames by calculating differences between the plurality of frames and binarizing the differences using a first value and a second value;
   extracting a grid for which a density of pixels with the first value is equal to or larger than a first threshold value from among a plurality of grids set in the difference image; and
   detecting the extracted grid as a moving object,
   wherein each of the plurality of grids is set such that as a distance from the camera becomes larger, the grid has a smaller pixel size, and
   wherein the moving object detection method further comprises changing the first threshold value according to the distance between each of the plurality of grids and the camera.

8. A non-transitory computer-readable storage medium storing a program for causing a computer to:
   acquire image data including a plurality of frames representing a surrounding condition of a mobile object, which are photographed by a camera mounted in the mobile object in time series;

calculate a difference image between the plurality of frames by calculating differences between the plurality of frames and binarizing the differences using a first value and a second value;

extract a grid for which a density of pixels with the first value is equal to or larger than a first threshold value from among a plurality of grids set in the difference image; and detect the extracted grid as a moving object, wherein each of the plurality of grids is set such that as a distance from the camera becomes larger, the grid has a smaller pixel size, size, and wherein the computer further changes the first threshold value according to the distance between each of the plurality of grids and the camera.

9. A moving object detection device comprising a non-transitory storage medium storing computer-readable commands and a processor connected to the non-transitory storage medium, the computer-readable commands, when executed, causing the processor to:

acquire image data including a plurality of frames representing a surrounding condition of a mobile object, which are photographed by a camera mounted in the mobile object in time series;

calculate a difference image between the plurality of frames by calculating differences between the plurality of frames and binarizing the differences using a first value and a second value;

extract a grid for which a density of pixels with the first value is equal to or larger than a first threshold value from among a plurality of grids set in the difference image; and detect the extracted grid as a moving object, wherein each of the plurality of grids is set in the difference image in advance such as a distance from the camera becomes larger, the grid has a smaller pixel size, and the processor detects whether or not there is a moving object for each of the plurality of grids, wherein the processor sets a size of each of the plurality of grids to a first size when the distance from the camera is equal to or smaller than a first distance, sets the size of each of the plurality of grids to a second size smaller than the first size when the distance from the camera is larger than the first distance and is equal to or smaller than a second distance, or sets the size of each of the plurality of grids to a third size smaller than the second size when the distance from the camera is larger than the second distance, and wherein grids of the first size, grids of the second size, and grids of the third size are set in advance in the difference image so as not to overlap with each other.

* * * * *